United States Patent [19]

Hamada

[11] Patent Number: 5,672,135
[45] Date of Patent: Sep. 30, 1997

[54] CONTROLLER FOR PLANETARY DIFFERENTIAL TYPE REDUCTION GEAR DEVICE

[75] Inventor: Tomoyuki Hamada, Mie, Japan

[73] Assignee: Teijin Seiki Co., Ltd., Osaka, Japan

[21] Appl. No.: 567,640

[22] Filed: Dec. 5, 1995

[30] Foreign Application Priority Data

Dec. 31, 1994 [JP] Japan .................. 6-338364

[51] Int. Cl.⁶ .................. H02K 47/04; G05B 1/06
[52] U.S. Cl. .................. 475/149; 475/150; 310/68 B
[58] Field of Search .................. 475/149, 150; 310/68 B, 68 R

[56] References Cited

U.S. PATENT DOCUMENTS

| | | | |
|---|---|---|---|
| 3,495,108 | 2/1970 | Van Buskirk | 310/68 R |
| 4,482,847 | 11/1984 | Rudich Jr. et al. | 310/68 B |
| 4,724,935 | 2/1988 | Roper et al. | 475/150 X |
| 4,860,612 | 8/1989 | Dick et al. | 475/150 X |
| 4,989,686 | 2/1991 | Miller et al. | 475/150 X |
| 5,486,757 | 1/1996 | Easley | 475/150 X |
| 5,508,574 | 4/1996 | Vlock | 475/150 X |

FOREIGN PATENT DOCUMENTS

| | | |
|---|---|---|
| 0 280 324 A1 | 8/1988 | European Pat. Off. . |
| 59-1895 | 1/1984 | Japan . |
| 82-F9685E/20 | 7/1981 | U.S.S.R. . |
| 2 261 531 A | 5/1993 | United Kingdom . |

Primary Examiner—Charles A. Marmor
Assistant Examiner—Nathan O. Jensen
Attorney, Agent, or Firm—Panitch Schwarze Jacobs & Nadel, P.C.

[57] ABSTRACT

A controller for a planetary differential type reduction gear device (1), in which a driving force of a motor (10) is controlled by controller and the speed is reduced by the planetary differential type reduction gear device (1) so that the reduced speed is transmitted to an output side and a predetermined work is carried out by the driving force on the output sides and in which an output rotation detector (14) is provided on the output side of the planetary differential type reduction gear device (1) so that the driving force of the motor (10) is controlled on the basis of information from the output rotation detector (14) to thereby carry out the predetermined work. The detection is made in the vicinity of the object to be controlled to thereby improve the control accuracy as well as the structure.

8 Claims, 6 Drawing Sheets

CONTROLLER FOR PLANETARY DIFFERENTIAL TYPE REDUCTION GEAR DEVICE

BACKGROUND OF THE INVENTION

The present invention relates to a controller for a planetary differential type reduction gear device. More particularly, the present invention relates to a controller for a reduction gear device of high reduction gear ratio, for example, provided in an articulation of an industrial robot or in an index device of a machine tool for driving an arm member or a work.

Recently, industrial robots are widely used in various industrial fields. In these industrial robots, various reduction gear devices having high reduction ratios are used so that motors connected to reduction gear devices are driven on the basis of predetermined programs to thereby finely control the movement of arm members of the robots.

As such a reduction gear device, a planetary differential type reduction gear device is a representative example, such as a CYCLO (trademark) reduction gear device, or a HARMONIC DRIVE (trademark) reduction gear device, which are both available as planetary differential type reduction gear devices.

In the control of the robot using the above-mentioned type reduction gear device, usually, a position detector (for example, an encoder) is provided on the input side of the reduction gear device to thereby detect the input rotational angles prior to the speed-reduction, on the basis of which a controller performs feed-back control for the operation such as machining on a work and so on.

In such a conventional controller, however, there arises the following problem: That is, the accuracy in detection is not always satisfactory since, as described above, the controller is arranged to detect the rotational position on the input side of the reduction gear device for the feed-back control. That is, the rotational position on the input side is detected and the rotational position on the output side through the speed reduction mechanism is estimated on the basis of the result of the above detection, so that the estimated rotational position on the output side is used as input information for feedback control. Such estimation of the rotational position as well as the fact that so-called backlash is unavoidable in a reduction gear device, causes errors or delays in control in association with the speed reduction and becomes the bar to improvement in control accuracy.

SUMMARY OF THE INVENTION

It is an object of the present invention to solve the above problems in the conventional art by providing a controller having an output rotation detector located on the output side of a reduction gear device so that detection is made in the vicinity of an object to be controlled.

According to the present invention, there is provided a controller for a planetary differential type reduction gear device, wherein a driving force of a motor is controlled by control means and the speed is reduced by the planetary differential type reduction gear device so that the reduced speed is transmitted to an output side and a predetermined work is carried out by the driving force on the output side, and wherein an output rotation detector is provided on the output side of the planetary differential type reduction gear device so that the driving force of the motor is controlled on the basis of information from the output rotation detector to thereby carry out the predetermined work.

According to the present invention, particularly preferably, the output rotation detector is provided on a back side of the output side of the planetary differential type reduction gear device, and an output shaft and a code plate of the output rotation detector are integrated so that there is an effect that the output rotation detector is protected from external shocks.

According to the present invention, since the output rotation detector is provided on the output side of the reduction gear device, errors or delays due to backlash or the like of the reduction gear device hardly occur upon speed reduction, and since the detection can be made in the vicinity of an object to be controlled, the control accuracy can be improved greatly.

Further, according to the present invention, since the output rotation detector is provided on the back side of the output side of the reduction gear device, the output rotation detector is protected from external shocks.

Further, according to the present invention, since the output shaft and the code plate of the output rotation detector are integrated, it is possible to make the code plate high in degree of concentricity with respect to the output shaft and high in degree of roundness. Further, it is possible to reduce conventional troubles in attachment and adjustment of the output rotation detector.

According to the present invention, therefore, it is possible to achieve the improvement of the control accuracy, the reduction of the producing steps, and the protection against external shocks, with respect to the controller for a planetary differential type reduction gear device.

BRIEF DESCRIPTION OF THE PREFERRED EMBODIMENT

DETAILED DESCRIPTION OF THE PREFERRED EMBODIMENTS

Figure 1:
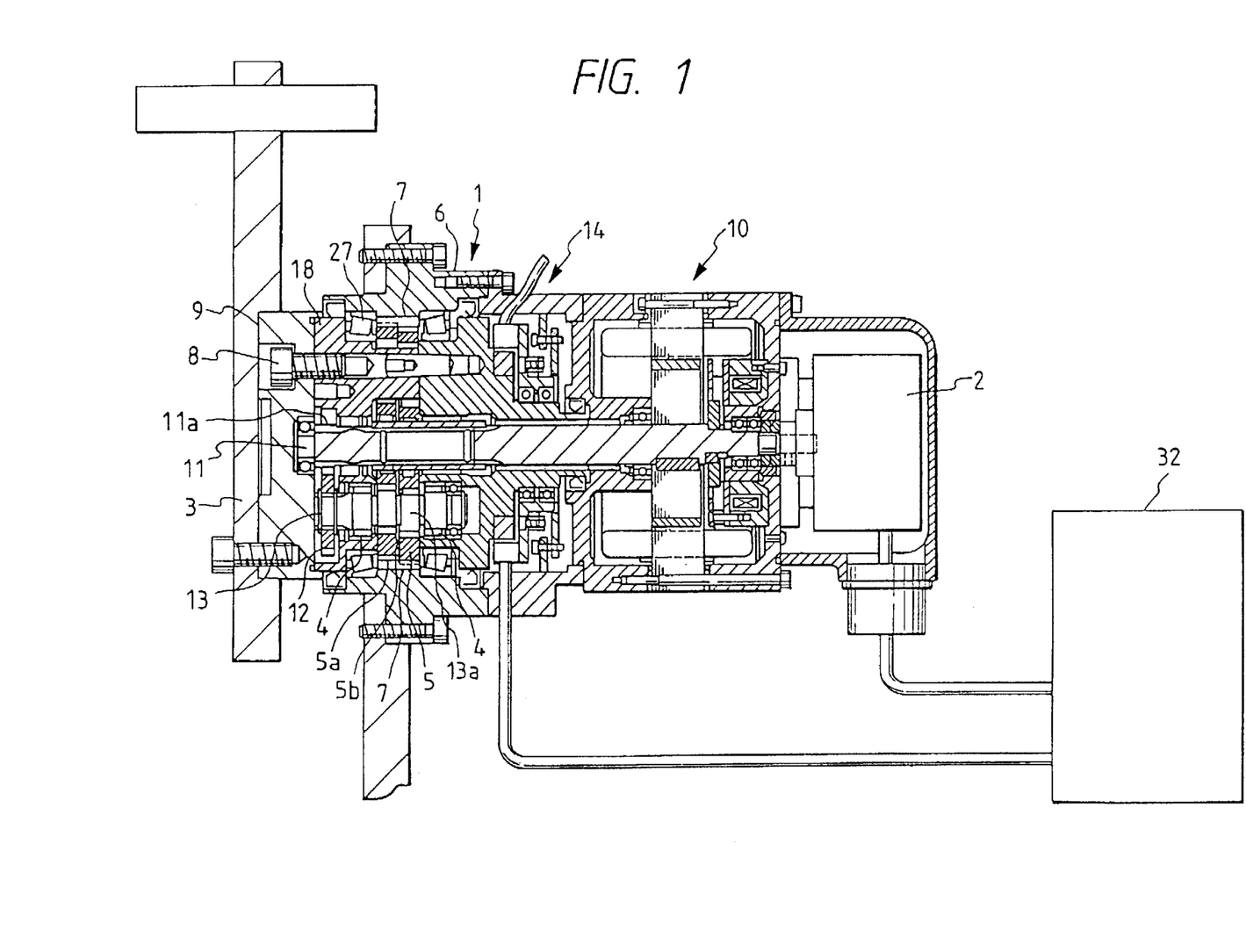
FIG. 1 is a cross-section showing an embodiment of the controller of the planetary differential type reduction gear device according to the present invention.

An embodiment of the planetary differential type reduction gear device controller according to the present invention will be described below in detail with reference to the drawings. First, the configuration will be described. In FIG. 1, a planetary differential type reduction gear device 1 is a kind of reduction gear device in which an external gear meshed with an internal gear performs eccentric oscillation movement similarly to a CYCLO reduction gear device. However, according to the present invention, the reduction gear device is not limited to such a reduction gear device but the present invention may be applied to a HARMONIC DRIVE reduction gear device. A driving motor 10 is connected to the planetary differential type reduction gear device 1 and the motor 10 is provided with an encoder 2 for detecting the rotational position of the motor per se.

The structure of the illustrated planetary differential type reduction gear device 1 is described below briefly. A rotary member 18 is rotatably supported through a pair of bearings 27 on a hub 6 of the planetary differential type reduction gear device 1 so that the rotary member 18 is rotatable together with an output portion 9. The rotary member 18 is constituted by a pair of discs which are connected by a connection member 8 integrally with each other.

Numbers of pins 7 are planted on the inner circumference of the hub 6 of the planetary differential type reduction gear device 1 so that the hub 6 is constituted as an internal gear with the pins 7 as its internal teeth.

A pair of pinions 5, each having, at its outer circumference, external teeth 5a which mesh with the internal teeth 7 of the hub 6, is movably supported between the pair of discs constituting the rotary member 18 so as to make orbiting motion.

A plurality of pin holes 5b are formed in each of the pinions 5, and a crank pin 13 passes through and is mounted on each pin hole 5b so that the pinion 5 can make eccentric, orbiting motion by means of the crank portions 13a of the crank pins 13. The crank pin 13 is rotatably supported through a pair of bearings 4 on the discs 18.

A gear 12 is mounted on one end portion of the crank pin 13 so that the gear 12 meshes with a pinion teeth portion 11a of an output shaft 11 of the driving motor 10.

As the output shaft 11 of the driving motor 10 rotates, this rotation is transmitted to the gear 12 and the rotation of the gear 12 is transmitted to the crank pin 13. Thus, the pinion 5 is made to perform eccentric, orbiting movement by the crank portion 13a of the crank pin 13. By this eccentric movement, the external teeth 5a formed on the outer circumference of the pinion 5 successively engage with the pins or internal teeth 7 formed on the inner circumference of the hub 6 so that only the movement of rotation on its own axis is extracted from the orbiting movement of the pinion 5, and thus the rotary member 18 and the output portion 9 are rotated with their speed greatly reduced relative to the rotation of the driving motor 10.

As described above, the input side of the planetary differential type reduction gear device 1 is connected to the driving motor 10. As to the driving motor 10, any kind of motor, for example, an electric motor, a fluid pressure motor driven by fluid pressure such as pneumatic pressure, hydraulic pressure, or the like, a rotation driving force system such as an invertor or the like, may be employed. The planetary differential type reduction gear device 1 receives the driving force of the driving motor 10, reduces the input rotational speed thereof through the planetary differential type speed-reduction gear train provided inside the reduction gear device 1, and transmits the rotation thus speed-reduced to the output side.

A work piece 3 is connected through the output portion 9 to the rotary member 18 which is the output side of the planetary differential type reduction gear device 1. An output rotation detector 14 is provided on the back side of the rotary member 18.

In the embodiment illustrated in FIG. 1, the output rotation detector 14 is provided on the back side of the output side of the planetary differential type reduction gear device, and the output rotation detector 14 is constituted by a code plate 16 and a sensor 17.

Figure 2:
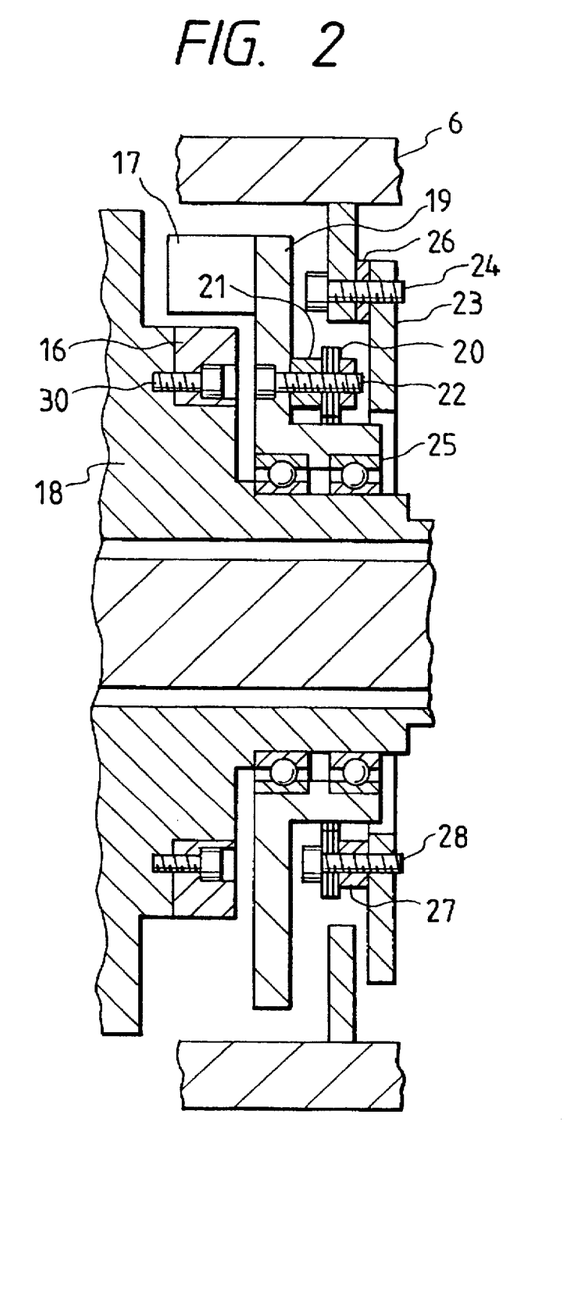
FIG. 2 is a main part enlarged view of FIG. 1 in which the upper half is shifted by 90 degrees in the sectional direction from the lower half.

As shown in FIG. 2, an annular shoulder portion is formed on the opposite side (back side) of the output side of the rotation output portion and the annularly formed code plate 16 is fitted onto the shoulder portion and fixed thereto by means of a bolt 30.

The code plate 16 has a structure in which numbers of bar magnets are arranged annularly. Specifically, the surface of each of the respective bar magnets is magnetized so as to be north (N) and south (S) poles. In this embodiment, the annular structure has two portions, in one of which 200 magnets each having a pair of N and S poles are arranged annularly on one circle in the order N and S; S and N; N and S; . . . , while in the other of which only one magnet having a pair of N and S poles is disposed on one circle, as shown in FIG. 3.

Figure 5A:
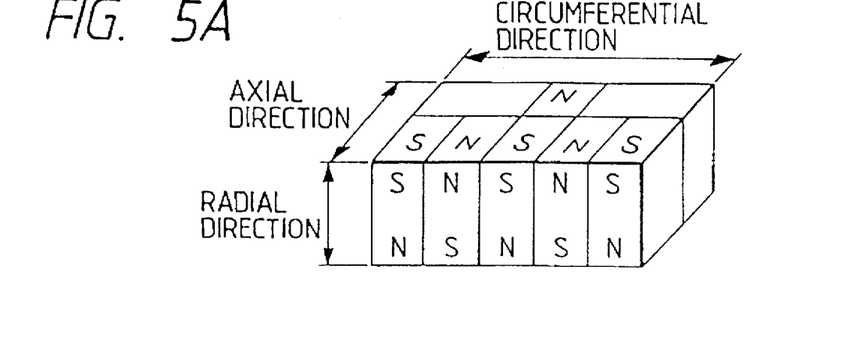
FIGS. 5A and 5B are schematic views, each showing an example of magnetization of the code plate.
Figure 5B:
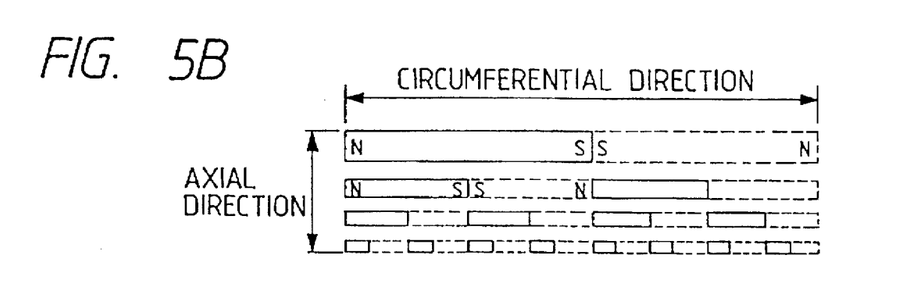

Other arrangements of magnets may be employed for the code plate 16. For example, as shown in FIG. 5A the bar magnets are directed radially with respect to a rotation axis so that the N and S poles are alternately arranged on the circumferential surface of the code plate 16. Also, as shown in FIG. 5B, the length of each magnets in a row may be made one half of the length of each magnets in axially adjacent row, and further, the twice number of magnets may be circumferentially arranged in the row in comparison to the adjacent row.

Figure 3:
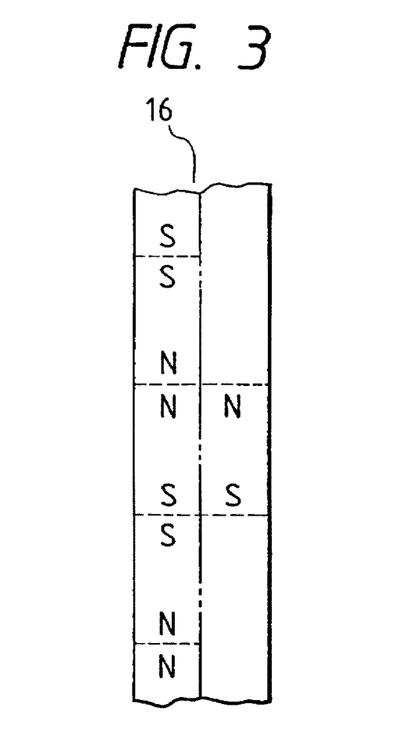
FIG. 3 is a development view showing the state of magnetization of the code plate.

In the embodiment shown in FIGS. 1, 2 and 3, the sensor 17 has two detecting portions so as to be able to detect magnetization signals along two magnet rows on the code plate 16, and is disposed on the outside position of the code plate 16. Although the sensor 17 is arranged to detect the magnetization signals generated from the circumferential surface of the code plate 16 in this embodiment, the magnet arrangement may be formed on the side surface (axial end surface) of the code plate 16 so that the sensor 17 detects the magnetization signals generated from the side surfaces of the code plate 16.

The sensor 17 may be directly supported onto the casing (i.e. the hub) 6, but the following arrangement is preferable. A sensor supporting plate 19 is supported by bearings 25 on the rotation output portion and the sensor 17 is attached on the sensor supporting plate 19. A plurality of plate springs 20 are attached onto the sensor supporting plate 19 by means of a bolt 22 through a collar 21.

On the other hand, a plate 23 is attached by means of a bolt 24 through a collar 26 onto the casing 6 of the planetary differential type reduction gear device 1, and the above-mentioned plate springs 20 are attached also by means of a bolt 28 onto the plate 23 through a collar 27 in another position different from the above-mentioned bolt 22. That is, the sensor 17 is supported by the casing 6 through the plate springs 20.

With the above-mentioned arrangement, the sensor 17 is rotatably supported onto the rotation detecting portion, and secured to the casing 6 through the plate springs 20. Thus, the sensor 17 can follow eccentric movement of the output rotational portion caused due to an external load with the aid of the plate springs 20. To this end, two or more sensors 17 may be provided so as to eliminate errors due to the eccentric movement of the code plate 16 (later described).

In FIGS. 1 and 2, the code plate 16 is fitted onto the shoulder portion of output shaft so as to be integrated with the output shaft. Thus, it is possible to obtain a code plate 16 which is high in degree of concentricity with respect to the output shaft and high in degree of roundness.

That is, as for the performance of an encoder such as the output rotation detector 14 used in the present invention, the accuracy is determined in accordance with the displacement of the rotational center of the code portion of the code plate 16 from the rotational center of the rotating body. Accordingly, as higher detection accuracy is required, it is necessary to make the above-mentioned displacement smaller. In the conventional method, however, after a code plate is produced, it is assembled as an encoder. Accordingly, it is necessary to adjust the degree of concentricity of the code plate relative to the rotational center, and such adjustment of the degree of concentricity is required again when the assembled encoder is attached to a measurement portion. In the above-mentioned embodiment of the present invention, on the contrary, such adjustment of the degree of concentricity is not required because the code plate 16 is attached directly on the rotation detecting portion, and very high accuracy can be easily realized.

If two or more sensors 17 are provided, it is possible to obtain a controller which is very high in accuracy even in the case where the eccentric rotational movement occurs. That is, in the case where two or more sensors are provided, these sensors are disposed symmetrically with respect to the rotational center. For example, when two sensors 17 are provided, those sensors 17 are disposed so as to be opposite to each other on a diameter (that is, with a central angular interval of 180 degrees). In the case where the code plate 16 becomes eccentric with respect to those sensors 17, the angular error due to eccentric movement increases with respect to one of the sensors 17, while the angular error due to eccentric movement with respect to the other sensor 17 decreases. Accordingly, if the detection signals of the respective sensors 17 are summed, the error of the sensors due to the eccentric movement can be eliminated theoretically. Thus, the error due to the eccentric movement of the code plate 16 can be eliminated more positively by providing two or more sensors 17.

The information generated from the output rotation detector 14 is supplied to a driver/controller 32 which controls the driving motor 10 so that a predetermined operation (such as machining, holding, moving, etc.) is performed on the work piece 3 with the speed-reduced driving force transmitted from the thus controlled driving motor 10.

Figure 4:
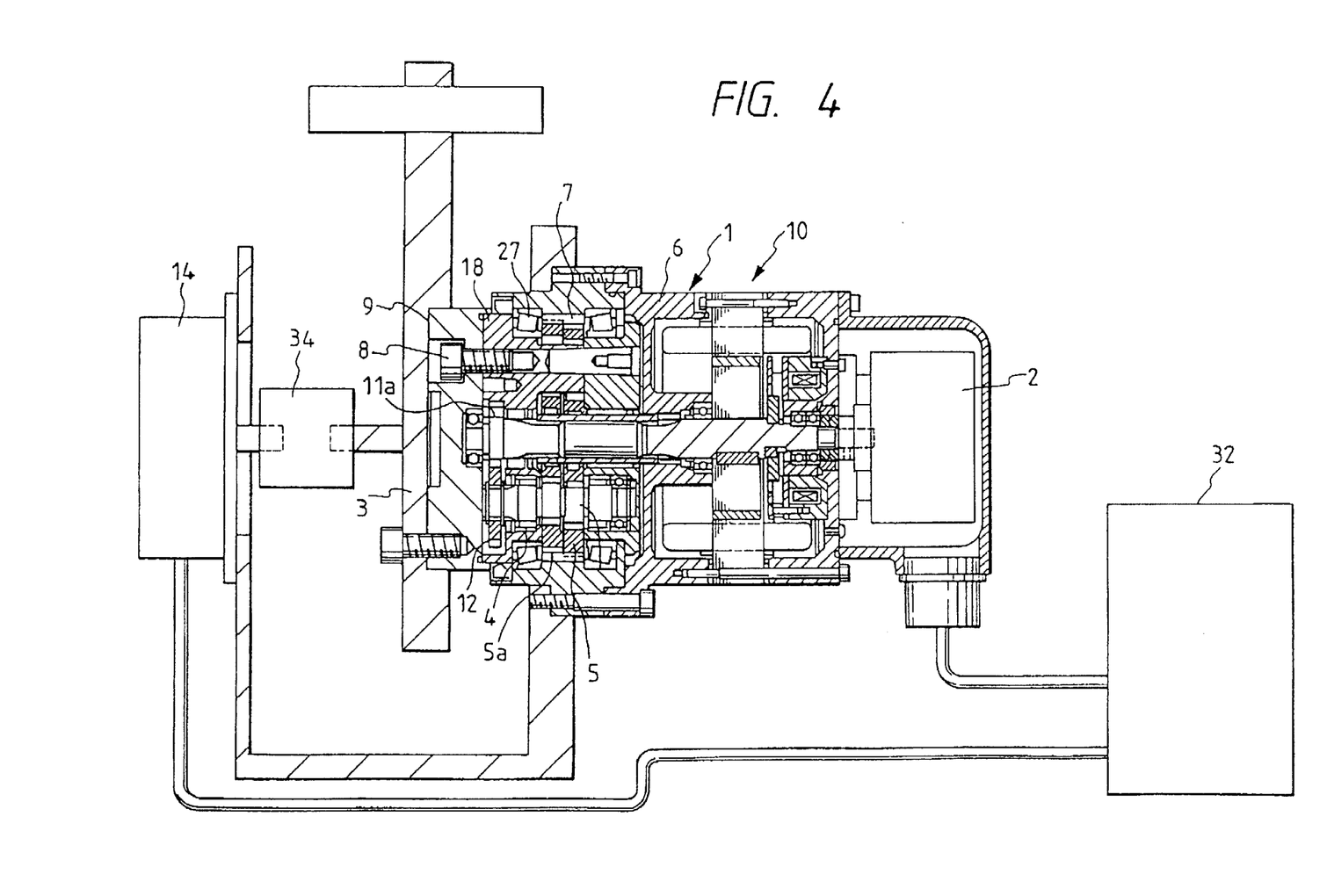
FIG. 4 is a cross-section showing another embodiment of the controller of the planetary differential type reduction gear device according to the present invention.

FIG. 4 shows another embodiment of the present invention. This embodiment shown in FIG. 4 is different from the first-mentioned embodiment of FIG. 1 in the point that while the output rotation detector 14 is provided on the back side of the output side of the planetary differential type reduction gear device 1 in the first-mentioned embodiment, the output rotation detector 14 is provided on the outside of the output side of the planetary differential type reduction gear device 1, that is, on the outside of the work piece 3, through a coupling 34, in this embodiment. Other points are the same as those in the first-mentioned embodiment and the description about them is omitted here.

Figure 6:
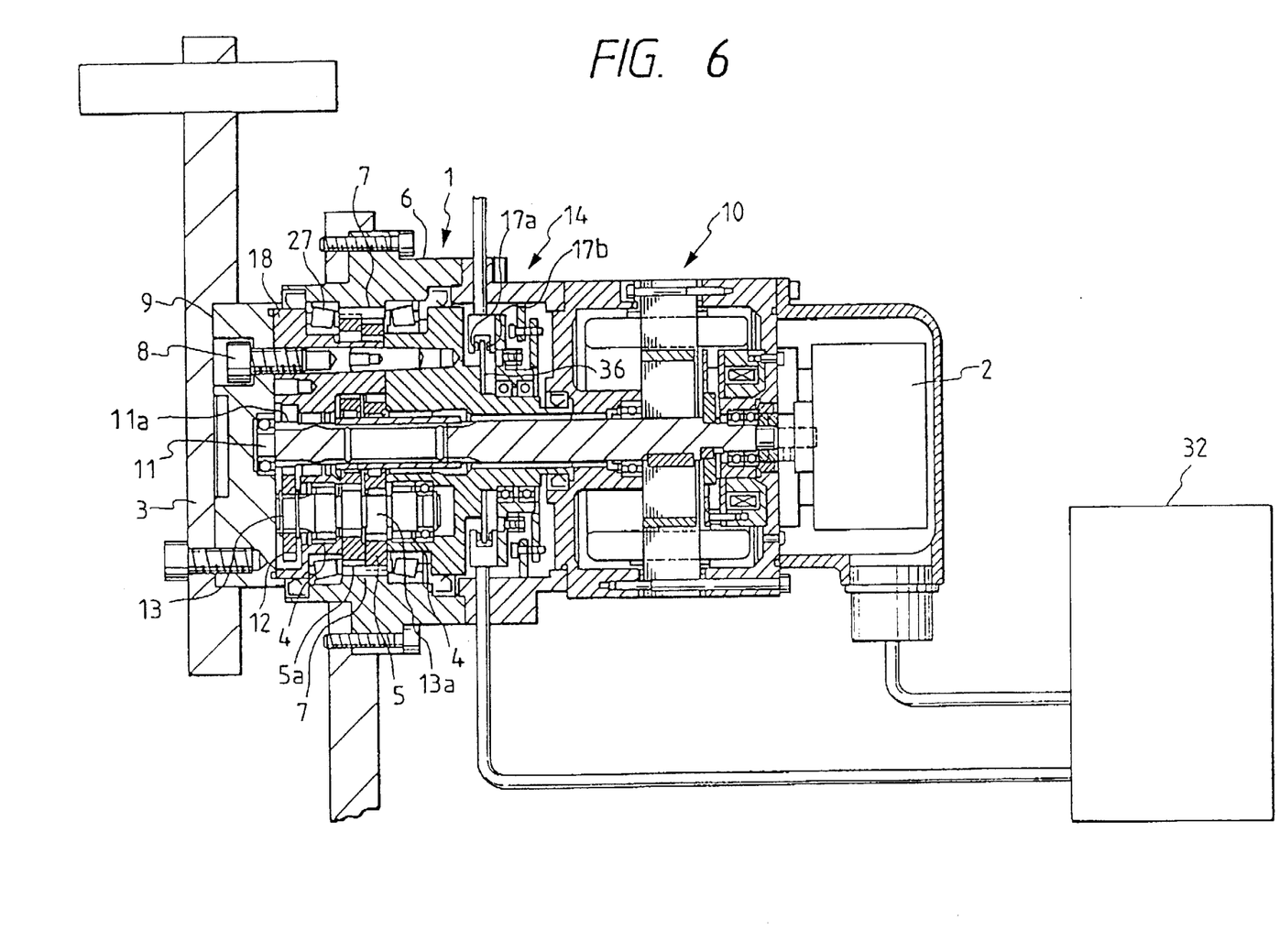
FIG. 6 is a cross-section showing another embodiment of the controller of the planetary differential type reduction gear device according to the present invention.
Figure 7:
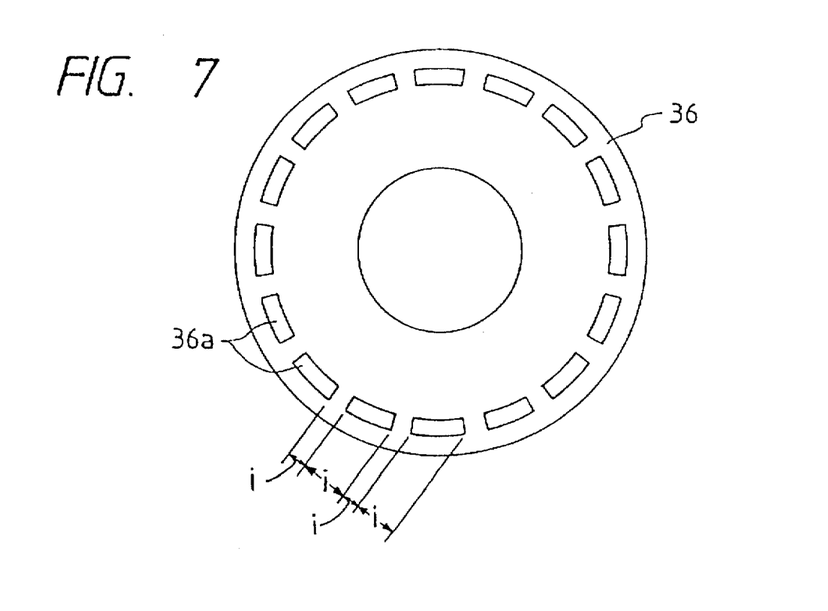
FIG. 7 is a schematic plane view showing the code plate used in an optical type sensor.

Each of the embodiments described above employs the magnet type detector as the output rotation detector 14. However, the present invention should not be restricted thereto or thereby. Various kind of encoders or resolvers can be used as the output rotation detector 14 without departing from the spirit of the invention. FIG. 6 shows another embodiment of the present invention in which an optical type detector is used as the output rotation detector 14. The output rotation detector 14 includes a sensor 17 made up of a light emitter 17a and a light receiver 17b, and a code plate 36 in the form of relatively thin circular plate. As shown in FIG. 7, the code plate 36 is formed with a plurality of through holes 36a arranged at the same angular intervals, i through which a light emitted from the emitter 17a can reach the receiver 17b. In addition, the circumferential length of each through hole 36a is set equal to the circumferential length of the interval.

Figure 8:
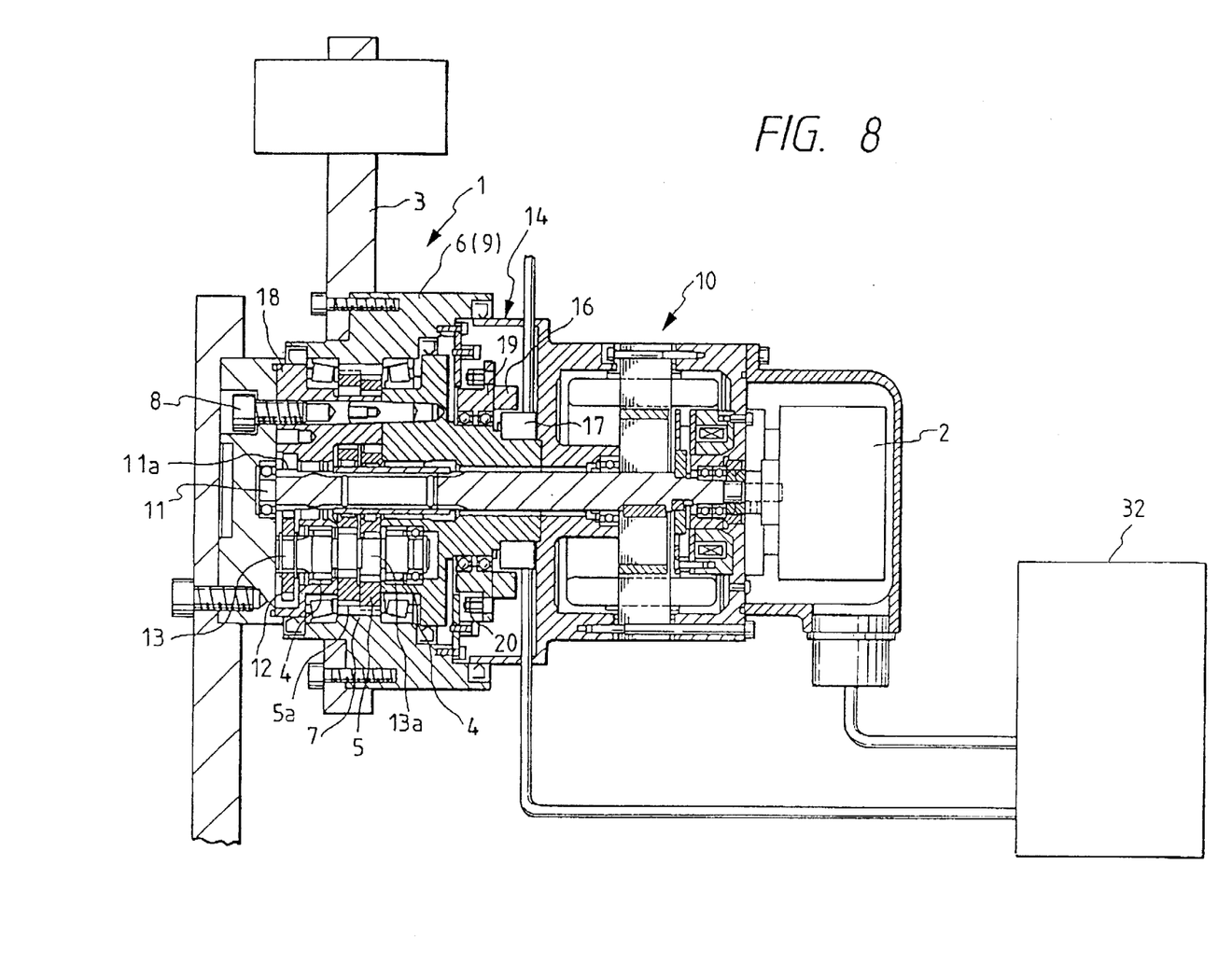
FIG. 8 is a cross-section showing another embodiment of the controller of the planetary differential type reduction gear device according to the present invention.

In each of the embodiments described above, the rotary member (i.e. a planet carrier) 18 is arranged rotatably with respect to the stationary side of the motor 10 whereas the hub (i.e. an internal gear member) 6 is fixed to the stationary side of the motor 10. As shown in FIG. 8 showing another embodiment, the present invention can be applied an alternative arrangement. That is, in the embodiment shown in FIG. 8, the hub 6 is arranged rotatably with respect to the stationary side of the motor 10 whereas the rotary member 18 is arranged fixed with respect to the stationary side of the motor 10. In this case, the hub 6 constitutes the output portion 9, so that the work piece 3 is fixed to the hub 6. In order to detect the output rotation of the hub 6 on the output side, the code plate 16 is supported fixedly with respect to the hub 6 through a sensor supporting plate 19, a plurality of plate springs 20, and the like, whereas the sensor 17 is fixedly attached to the rotary member 18. In addition, the magnet arrangement as shown for instance in FIG. 3 is provided on an inner circumferential surface of the code plate 16 in this embodiment.

According to the present invention, since high accuracy position detection is performed on the output side of the planetary differential type reduction gear device, it is possible to improve the accuracy in feedback control.

What is claimed is:

1. A controller for a planetary differential type reduction gear device which receives a driving force from a motor at an input side, reduces speed of the driving force through a planetary differential type reduction gear train and transmits the driving force thus speed-reduced to an output side, said controller comprising:

an output rotation detector, provided on a back side of the output side of said planetary differential type reduction gear device and having a code plate integrated on said output side of said planetary differential type reduction gear device, for detecting the driving force thus speed-reduced through said planetary differential type reduction gear train; and control means for controlling the driving force to be applied to said input side of said planetary differential type reduction gear device on the basis of the driving force thus detected by said output rotation detector.

2. A controller for a planetary differential type reduction gear device according to claim 1, wherein said planetary differential type reduction gear device is arranged substantially coaxially with respect to said motor, and said output rotation detector is provided axially between said motor and said planetary differential type reduction gear device.

3. A controller for a planetary differential type reduction gear device according to claim 1, wherein said output rotation detector includes an annular code plate coaxially provided with respect to said output side of said planetary differential type reduction gear device.

4. A controller for a planetary differential type reduction gear device according to claim 3, wherein the driving force thus speed-reduced through said planetary differential type reduction gear train is output from a planet carrier of said planetary differential type reduction gear device, and said code plate is fixed to said planet carrier.

5. A controller for a planetary differential type reduction gear device according to claim 3, wherein the driving force thus speed-reduced through said planetary differential type reduction gear train is output from an internal gear member of said planetary differential type reduction gear device, and said code plate is fixed to said internal gear member.

6. A controller for a planetary differential type reduction gear device according to claim 1, wherein said output rotation detector includes a code plate and a sensor, one of said code plate and said sensor being fixed to the output side of said planetary differential type reduction gear device, and the other of said code plate and said sensor being rotatably supported on the output side of said planetary differential type reduction gear device and fixed with respect to a stationary side of said motor.

7. A controller for a planetary differential type reduction gear device according to claim 6, wherein the other of said code plate and said sensor is fixed with respect to said stationary side of said motor through spring means.

8. A controller for a planetary differential type reduction gear device according to claim 6, wherein the other of said code plate and said sensor is rotatably supported on the output side through a ball bearing.

\* \* \* \* \*